United States Patent [19]

Lowery

[11] Patent Number: 5,108,599

[45] Date of Patent: Apr. 28, 1992

[54] LOW PRESSURE LIQUID FILTER CARTRIDGE AND METHOD OF MAKING

[75] Inventor: Richard K. Lowery, Warminster, Pa.

[73] Assignee: National Safety Associates, Inc., Memphis, Tenn.

[21] Appl. No.: 381,447

[22] Filed: Jul. 18, 1989

[51] Int. Cl.$^5$ .............................................. B01D 27/08
[52] U.S. Cl. .................................... 210/232; 210/282; 210/416.3; 210/450; 210/497.01; 29/DIG. 29; 29/DIG. 77; 29/520; 29/521
[58] Field of Search .................. 210/232, 282, 416.3, 210/450, 497.01, 500.21, DIG. 17; 29/DIG. 77, DIG. 29, 902, 520, 521, 282, 283.5

[56] References Cited

U.S. PATENT DOCUMENTS

| | | | |
|---|---|---|---|
| 3,000,506 | 9/1961 | Hultgren | 210/DIG. 17 |
| 3,333,703 | 8/1967 | Scavuzzo et al. | 210/DIG. 17 |
| 4,369,113 | 1/1983 | Stifelman | 210/DIG. 17 |
| 4,392,296 | 7/1983 | Kanamaru et al. | 29/520 |
| 4,829,654 | 5/1989 | Hangebrauck | 29/521 |
| 4,855,047 | 8/1989 | Firth | 210/232 |

Primary Examiner—Robert A. Dawson
Assistant Examiner—Wanda L. Millard
Attorney, Agent, or Firm—Heiskell, Donelson, Bearmen, Adams, Williams & Kirsch

[57] ABSTRACT

A method for making a low pressure cartridge for liquid filtration, particularly of minerals from drinking water, comprises locating a pair of substantially identical end cap members telescopically on opposing ends of a tubular member. The end cap members are coupled to the tubular member mechanically by interference between four circumferential rings raised from an inner surface of each of the end caps and like numbers of circumferential grooves on a facing surface of the tubular member. O-rings between the telescoped members provide further fluid sealing and increased mechanical coupling, if desired. Different axial spacing between different adjoining pairs of rings assure axial alignment of the end caps with the tubular member during assembly.

21 Claims, 2 Drawing Sheets

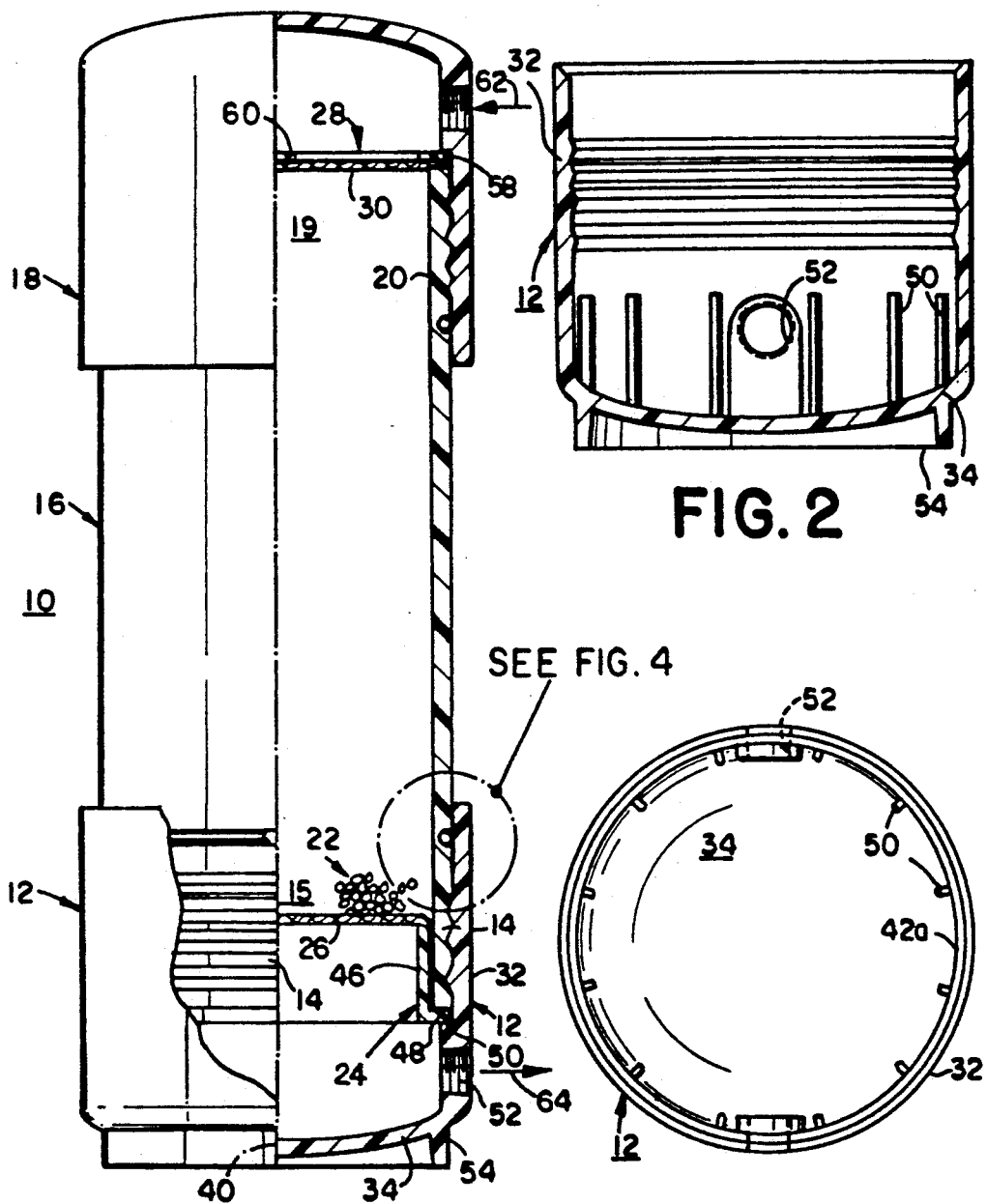

LOW PRESSURE LIQUID FILTER CARTRIDGE AND METHOD OF MAKING

FIELD OF THE INVENTION

The invention relates to filtration and, in particular, to low pressure liquid filtration, especially drinking water.

BACKGROUND OF THE INVENTION

A variety of manufacturers currently offer filtering devices for filtering drinking water which include replaceable filter cartridges. Typically, activated charcoal is the major filtering agent. In some devices the filter may be directly hooked to a faucet or along a line feeding a faucet. In others water is gravity fed from a storage container or other reservoir through the filter cartridge at a relatively low pressure.

A number of manufacturing techniques have been used previously to assemble such filter cartridges. Components of the cartridge may be screwed together, sonically welded and/or solvent bonded. Each approach has its disadvantages.

Screw-together components are relatively expensive to manufacture as threads must be provided. Even where plastic components are used, complicated molds or complicated fabricating techniques must be employed to form the threads and/or remove a molded threaded component from the mold.

Sonically welded components require additional sonic bonding equipment to perform the sonic bonding step. Moreover, the sonic bond must be tested or multiple sonic bonds provided to assure sealing.

Solvent bonding of components is perhaps the least expensive. However, it is also the least desirable since the solvents can enter the filtration agent and contaminate the cartridge. Solvent bonding is particularly undesirable for cartridges which are being used to filter drinking water.

SUMMARY OF THE INVENTION

The present invention is directed to methods of making low pressure filter cartridges, particularly for the filtration of drinking water, and the cartridges made thereby, which are relatively inexpensive in cost in comparison with previously employed fabricating methods and further provide the advantage of eliminating solvents and other undesired construction materials which might contaminate the contents of the cartridges.

In one aspect, the invention is a method of making a low pressure cartridge for liquid filtration. The method comprises the step of locating at a first open end of a tubular member, a first end cap member including a cylindrical side wall sized to fit telescopically with a first end portion of the tubular member. The first end cap member further includes an end wall transverse to the cylindrical side wall for covering the first open end. The cylindrical side wall and the first end portion of the tubular member together include at least two circumferential raised rings and at least an equal number of circumferential grooves. The grooves are sized and spaced axially from one another to simultaneously receive all of the raised rings. The method further comprises the step of pressing the first end cap member and the tubular member together until each of the raised rings is seated in a separate circumferential groove. Interference between the circumferential grooves and the raised rings seated therein constitute the only means coupling the first end cap member and the tubular member together.

In another aspect, the invention includes the filter cartridge produced by the aforesaid method.

BRIEF DESCRIPTION OF THE DRAWINGS

The foregoing summary as well as the following detailed description of the preferred embodiments of the invention will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1 is a partially cut away front elevation view of a filter cartridge according to the present invention;

FIG. 2 is a front section elevation of a first end cap member of the filter cartridge of FIG. 1;

FIG. 3 is a plan view of the first end cap member from the top of FIG. 2;

DETAILED DESCRIPTION OF PREFERRED EMBODIMENTS

Figure 4:
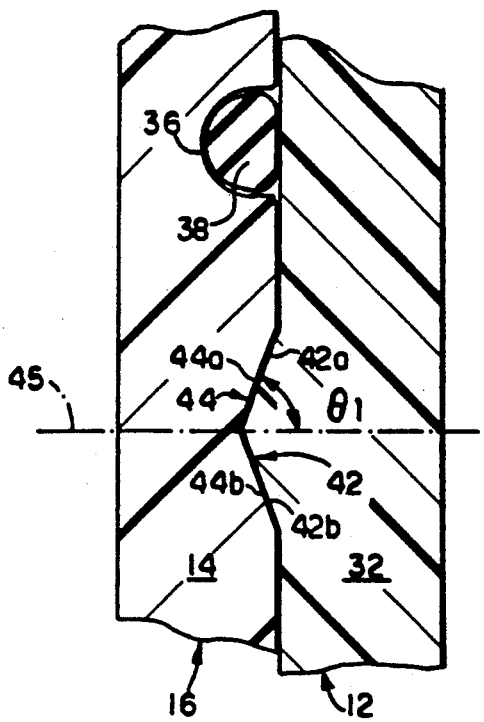
FIG. 4 depicts an expanded view of area A in FIG. 1.

Like numerals are employed in the drawings for the indication of like elements throughout.

There is shown in FIG. 1 a preferred embodiment filter cartridge 10 for the low pressure filtration of fluids, particularly drinking water.

The filter cartridge 10 includes a first end cap member 12, which is received on a first end portion 14 at a first open end 15 of a tubular member 16, a second, substantially identical end cap member 18 which is received on a second end portion 20 at a second open end 19 of the tubular member 16. Filtering means, preferably a loose activated charcoal filtering agent 22, is held within the tubular member 16 by first porous retaining means int he form of a first, generally annular retainer 24 and a first porous flexible membrane 26 located at the first open end 15. The filtering agent 22 is retained in the second open end 19 by a second porous retaining means in the form of a second, generally annular retainer 28 and second porous flexible membrane 30.

The first end cap member 12 includes a cylindrical side wall 32 which is sized to fit telescopically with the first end portion 14 of the tubular member 16, preferably over the outside of the tubular member 16. The first end cap member 12 further includes an end wall 34 transverse to the cylindrical side wall 32 which closed the first open end 15 of the tubular member 16. The cylindrical side wall 32 of the first end cap member 12 and the first end portion 14 of the tubular member 16 together include at least two, more desirably at least three, and preferably at least four circumferential raised rings 42, one of which can be seen in detail in FIG. 4, and at least an equal number of circumferential grooves 44, one of which can also be seen in detail in FIG. 4. The grooves 44 are sized and spaced axially from one another (i.e. positioned with respect to a central axis 40 of the cartridge 10 and the first end cap and tubular members 12 and 16) to simultaneously receive all of the raised rings 42 which are provided. Interference between the circumferential grooves 44 and the raised rings 42 seated therein couple the first end cap member 12 and the tubular member 14 together.

If desired, gasketing, for example in the form of a flexible O-ring 38, may be further provided between the first end cap member 12 and the tubular member 16, in particular between the first end portion 14 and cylindrical side wall 32 as a further security to seal the cartridge 10 against liquid leakage between the first end cap member 12 and the first end portion 14 of the tubular member 16 and to permit the filter cartridge 10 to remain sealed at higher internal pressures, for example greater than about 10 psi. Preferably, the O-ring 38 is seated in its own circumferential groove 36. Preferably the O-ring groove 36 has a deepened semicircular configuration in which the radial depth of the groove 36 is more than one-half its diameter in an axial direction for retaining the O-ring 38 while the first end cap member 12 is slipped over the first end portion 14. Where an O-ring 38 is provided, it, or at least friction between it and the first end cap member 12, may contribute tot he coupling provided by the interference between the mated circumferential grooves 44 and raised rings 42 to constitute with the grooves and the raised rings seated therein the only means coupling the first end cap member 12 and the tubular member 16 together. Where the O-ring 38 or like gasketing is omitted, interference between the circumferential grooves 44 and raised rings 42 seated therein constitute the only means coupling the first end cap member 12 and tubular member 16 together or sealing the space therebetween.

In the preferred embodiment, each of the raised rings 42 is formed on the inner circumferential surface of the cylindrical side wall 32 of the first end member 12. Each of the circumferential grooves 44 is formed in an outer circumferential surface of the first end portion 14 of the tubular member 16. While forming all of the raised rings 42 on one member and all of the circumferential grooves 44 on another member is preferred for simplicity of fabrication, there is no requirement that all of the grooves or all of the raised rings 42 be located on one or the other of the two members 12 and 16.

Preferably, where three or more raised rings 42 are provided, the axial spacing between adjoining pairs of the seated raised rings 42 is different for different adjoining pairs as is shown in Fig. 1. Axial spacing between adjoining pairs of circumferential grooves 44 also differ in an identical manner so that there is only one axial position of the first end cap member 12 with respect to the first end portion 14 in which each of the raised rings 42 is aligned with and seated in a circumferential groove 44.

This provides two benefits. First, until axial alignment is reached, no more than one ring 42 will be seated at a time in a groove 44 when the first end cap member 12 is being pressed onto the first end portion 14 of the tubular member 16. This permits relatively easy movement of the first end cap member 14 onto the tubular member 16. Second, when the members 12 and 16 are finally axially aligned, all rings 42 will seat in grooves 44 making further axial movement of the members 12 and 16 with respect to one another considerably more difficult, thereby indicating that assembly has been completed.

Referring again to FIG. 4, the radial cross-section of a raised ring 42 and circumferential groove 44 can be seen. Each of the grooves 44 and each of the raised rings 42 preferably is generally triangular in radial cross-section. Each of the grooves 44 includes a pair of generally planar, beveled walls 44a and 44b. Preferably, each of the raised rings 42 also includes a pair of generally planar, beveled walls 42a and 42b symmetric to walls 44a and 44b, respectively. Preferably, each of the beveled walls 42a, 42b, 44a, 44b, forms a lesser included angle (i.e. an angle less than ninety degrees) $\theta$ of about seventy degrees or less with respect to a radial axis 45 of the member 12 or 16, respectively, supporting the beveled walls 42a, 42b, 44a or 44b, respectively. In FIG. 4, each beveled wall 42a, 42b, 44a and 44b forms the same lesser included angle of about seventy degrees with radial axis 45. O-ring 38 and its receiving groove 36 on the outer surface of the first end portion 14 are also indicated.

Referring back to FIG. 1, in addition to the provision of the circumferential grooves 42, the outer circumferential surface of the first end portion 14 of the tubular member 16 is preferably inwardly tapered slightly, for example, about one-half degree, for ease of fabrication of that member 12 and subsequent assembly. The inner circumferential surface of the first end portion 14 is also preferably tapered radially outwardly slightly, for example, about one-quarter degree, also for ease of manufacture and for compressing a portion of the first porous flexible membrane 26 between that surface and the first retainer 24, in particular, an outer cylindrical surface of an axially extending annular portion 46 of the first retainer 24. A radially extending annular portion 48 of that retainer 24 is received in a space formed between the annular end surface of the tubular member 16, which is exposed at the first open end 15, and a plurality of lands provided by the axial ends of a plurality of ribs 50 provided in the first end cap member 12. The ribs 50, best seen in FIGS. 2 and 3, project radially inwardly from the remainder of the cylindrical side wall 32 not overlapping the first end portion 14 and extend in an axial direction from the inner side of the end wall 34.

The grooves 44 are located so that when the raised rings 42 are seated therein, the first porous flexible membrane and annular portion 48 of the first retainer 24 ar clamped between the ribs 50 and end of the tubular member 16. The clamping of the first retainer 24 and first porous flexible membrane 26 between the ribs 5 and the annular end surface of the tubular member 16 further assists sealing of the inner circumferential surface of the tubular member 16 to prevent blow by of liquid along that surface, by-passing the loose filtering agent 22.

As is best seen in FIGS. 2 and 3, the first end cap member 12 is further provided with orifice means in the form of a bore 52 extending radially through the cylindrical side wall 32 of the first end member between a pair of the adjoining ribs 50. The bore 52 is provided for passing liquid through the filter cartridge 10. The first end cap member 12 is further preferably provided with an annular skirt 54 extending axially from the end wall 34. The remote end surface of the skirt 54 is planar and perpendicular to the central axis 40 of the filter 10 (see FIG. 1) and parallel to the radial axis 45 (see FIG. 4), providing a base for standing the filter cartridge 10 upright.

Referring back to FIG. 1, preferably, the second end portion 20 of the tubular member 16 is configured symmetrically to the first end portion 14, including a second O-ring groove symmetrically positioned with respect to the circumferential O-ring groove 36 and an identical number of raised ring receiving circumferential grooves symmetrically positioned to the circumferential grooves 44. The second end cap member 18 is preferably identical to the first end cap member 12 except that the annular skirt 54 of the first end cap member 12 may be omitted for cost savings.

A "lighter" construction is used for the second retainer 28 and second porous flexible membrane 30. These are located at the "upper" end of the filter cartridge 10, which is preferably the inlet end. As a result, the second porous flexible membrane 30 is partially supported by the underlying filtering agent 22. As can be seen in FIG. 1, the second retainer 28 includes a planar ring portion 58 and, preferably, one or more transverse ribs 60 which provide strength and assist in trapping the second porous flexible member 30 against the filtering agent 22. Again, the ring portion 58 of the second retainer 28 and an outer circumferential portion of the second porous flexible member 30 are received in an annular groove provided between the exposed, transverse, axial end surface of the tubular member 16 at the second open end 19 and the lands provided by the axial ends of ribs of the second end cap member 18 and are compressed between those portions of those two members 16 and 18 when the second end cap member 18 and the tubular member 16 are axially aligned with the raised rings of the second end cap member 18 all seated in circumferential grooves along the second end portion 20 of the tubular member 16.

Preferably, each of the end cap members 12 and 18, the tubular member 16 and each of the retainers 24 and 28 is one piece and molded from a plastic material having some expandability, for example polypropylene, polyethylene, ABS or, preferably, PVC. For example, it has been found possible to injection mold the end cap members with outer diameters of about three-and-three-quarter inches and nominal wall thicknesses of about one-eighth inch with integrally molded rings raised an additional 0.03 inches and still obtain removal of the end cap members from the tip of a molding mandrel, without resorting to collapsible mandrel construction. Similar considerations and advantages apply to the molding of the tubular member 16. The use of such plastic further permits relatively easy dry sliding movement of the end cap members 12 and 18 onto the ends of the tubular member 16 thereby permitting assembly without lubricants or other possibly contaminating materials.

The preferred method of making the preferred filter cartridge 10 depicted in the FIGS. 1 through 4, after molding or other fabrication of each of the members 12, 16, and 18 and the retainers 24 and 28 is straightforward. The first porous flexible membrane 26 is placed on the "upper" end of the axially extending annular portion 46 of the first retainer 24 and the first open end 15 of the tubular member 16 pressed over the flexible membrane 26 and annular portion 46 to stretch the flexible membrane 26 over portion 46 and compress the circumferential edge portion of the flexible membrane 26 between the annular portions 46 and 48 of the first retainer 24 and surfaces of the tubular member 16 and lands of the ribs 50. The first O-ring 38 is positioned in its groove 36 along the first end portion 14. The first end cap member 12 is located at the first open end 15 of the tubular member 16 and the members 12 and 16 pressed together until each of the raised rings 42 is seated in a separate groove 44. The loose filtering agent 22 is thereafter added to the tubular member 16 to an appropriate height and covered with the second porous flexible membrane 30 and second retainer 28. The second O-ring is positioned in its groove along the second end portion 20 of the tubular member 16. The second end cap member 18 is located at the second open end 19 of the tubular member 16 and the members 18 and 16 pressed together until each of the raised rings of the second end cap member 18 is also seated in a separate groove along the second end portion 20 of the tubular member 16, thereby completing construction of the filter cartridge 10 shown in FIG. 1.

To use filter cartridge 10, hoses or other comparable means (not depicted) may be connected with the bore 52 of the first end cap member 12 and a like bore of the second end cap member 18 for feeding liquid into the cartridge 10, as indicated by arrow 62 in FIG. 1, and carrying filtered liquid away from the filter cartridge 10 as indicated by arrow 64 in that figure. More preferably, the filter cartridge 10 may be located in a larger housing (not depicted), which is provided with suitable gasketing for fluidly isolating the bores 52 through the end cap members 12 and 16 from one another. Liquid to be filtered, such as water, and filtered liquid, such as water for drinking, are fed to and from the filter cartridge 10, respectively, by appropriate plumbing associated with the larger housing (none depicted).

The raised rings 42 and mating circumferential grooves 44 provide adequate mechanical coupling and liquid sealing to dispense with the O-rings 38, if desired, for sufficiently low pressure filtering applications, for example, gravity fed liquid filtration from a reservoir in which hydrostatic head pressure typically does not exceed about fifteen psi. The depicted preferred embodiment 10 with O-rings 38 has been successfully tested to internal fluid pressures of about one hundred psi or more without leakage or cartridge failure. While this pressure is relatively high compared to the fifteen psi pressure considered for gravity feed, it is still considerably less than the three hundred and fifty psi pressure at which high-pressure water filter cartridges are typically required to be tested.

Figure 5:
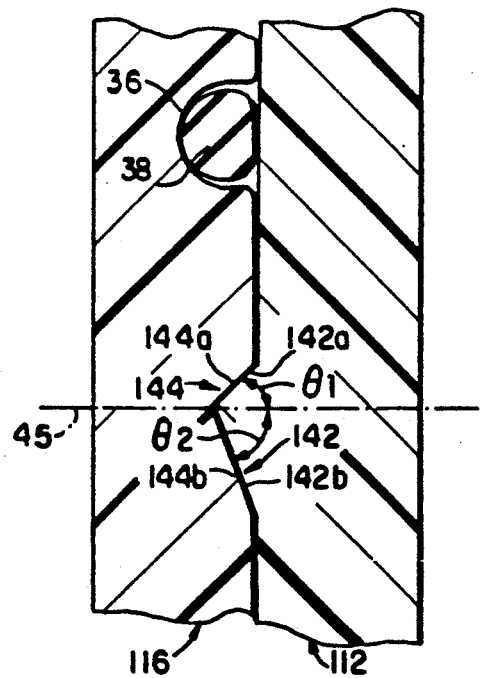
FIG. 5 depicts an expanded view of an alternate raised ring/groove configuration.

FIG. 5 depicts diagrammatically an alternate configuration of a circumferential groove 144 and a mating raised ring 142. In this configuration the side walls 144a and 144b of the groove form different lesser included angles 81 and 02, respectively, with a radial axis 40 of the tubular member 116 in which the groove 144 is provided. Surface 144a which forms the smaller included angle 01 and thus provides the steeper slope, is the beveled surface first contacted by the ring(s) 142 of the end cap member 112 when the member 112 is pressed onto a tubular member 116. The unequal angles 01 and 02 permit the ring(s) 142 to be more easily pushed along surface 144b, in the proper direction for assembly, than to be pulled back up the surface 144a, thereby providing a latching effect between the ring(s) 142 and groove(s) 144. While walls 144a and 144b are oriented to the same lesser included angles 81 and 82, respectively, as are walls 142a and 142b, this is not a requirement. For example, the lesser included angles formed by walls 142a and 142b can be less than the lesser included angles formed by walls 144a and 144b, respectively.

From the foregoing description, it can be seen that the present invention provides an easily fabricated filter cartridge having mechanically self-sealing housing members. While some variations and modifications thereto have been suggested, it will be recognized by those skilled in the art that other changes could be made to the above-described embodiments of the invention without departing from the broad inventive concepts thereof. It is understood, therefore, that this invention is not limited to the particular embodiments disclosed, but is intended to cover any modifications which are within the scope and spirit of the invention, as defined by the appended claims.

We claim:

1. A method of making a low pressure cartridge for liquid filtration comprising the steps of:

locating at a first open end of a tubular member, a first end cap member including a cylindrical side wall sized to fit telescopically with a first end portion of the tubular member, the first end cap member further including an end wall transverse to the cylindrical side wall for covering the first open end, the cylindrical side wall and the first end portion of the tubular member together including at least two circumferential raised rings and at least an equal number of circumferential grooves, the grooves being sized and spaced axially from one another to simultaneously receive all of the raised rings; and pressing the first end cap member and the tubular member together until each of the raised rings is seated in a separate circumferential groove, interference between the circumferential grooves and the raised rings seated therein constituting the only means coupling the first end cap member and the tubular member together.

2. The method of claim 1 wherein the pressing step further comprises compressing gasketing between the first end cap member and the tubular member, the gasketing and interference between the circumferential grooves and the raised rings seated therein constituting the only means coupling the first end cap member and the tubular member together.

3. The method of claim 1 further comprising integrally molding the tubular member and integrally molding the first end cap with the raised rings and the circumferential grooves.

4. A method of making a low pressure cartridge for liquid filtration comprising the steps of:

locating at a first open end of a tubular member, a first end cap member including a cylindrical side wall sized to fit telescopically with a first end portion of the tubular member, the first end cap member further including an end wall transverse to the cylindrical side wall for covering the first open end, the cylindrical side wall and the first end portion of the tubular member together including at least two circumferential raised rings and at least an equal number of circumferential grooves, the grooves being sized and spaced axially from one another to simultaneously received all of the raised rings; and pressing the first end cap member and the tubular member together until each of the raised rings is seated in a separate circumferential groove, interference between the circumferential grooves and the raised rings seated therein constituting the only means coupling the first end cap member and the tubular member together;

locating at a second open end of said tubular member opposite the first open end, a second end cap member including a cylindrical side wall sized to fit telescopically with a second end portion of the tubular member at the second open end, the second end cap member further including an end wall transverse to the cylindrical side wall for covering the second open end, the cylindrical side wall of the second end cap member and the second end portion of the tubular member together including at least two circumferential raised rings and at least an equal number of circumferential grooves, the grooves being sized and space axially from one another to simultaneously received all of the raised rings; and pressing the second end cap member and the tubular member together until each of the raised rings is seated in a separate groove, interference between the circumferential grooves and the raised rings seated therein constituting the sole means coupling the second end cap member and the tubular member together.

5. The method of claim 4 wherein the pressing step further comprises compressing gasketing between the cylindrical side wall of each of the first and second end cap members and the first and second end portions, the gasketing and interference between the circumferential grooves and the raised rings seated therein constituting the sole means securing the first and second end cap members and the tubular member together.

6. A method of making a low pressure cartridge for liquid filtration comprising the steps of:

locating at a first open end of a tubular member, a first end cap member including a cylindrical side wall sized to fit telescopically with a first end portion of the tubular member, the first end cap member further including an end wall transverse to the cylindrical side wall for covering the first open end, the cylindrical side wall including at least three circumferential raised rings on an inner surface thereof and the tubular member including at least three circumferential grooves on an outer surface thereof, the grooves being sized and spaced axially from one another to simultaneously receive all of the raised rings, each of said circumferential grooves and said raised rings being generally triangular in radial cross-section with a pair of generally planar, beveled walls, said beveled walls forming a lesser included angle of about 70° or less with respect to a radial axis of the respective member supporting the beveled wall;

operatively disposing at least one O-ring circumferentially around said first end portion of the tubular member;

pressing the first end cap member and the tubular member together until each of the raised rings is seated in separate circumferential groove and said at least one O-ring is compressed between the first end cap member and the tubular member to prevent liquid leakage therebetween, with the O-ring, the circumferential grooves, and the raised rings seated therein constituting the only means coupling the first end cap and tubular members together;

providing orifice means through the first end cap member for passing liquid through the filter cartridge;

providing a loose filtering agent disposed in the tubular member; and providing first porous retaining means at least partially held between the first end cap member and the tubular member at the first open end for passing a liquid between the orifice means and the loose filtering agent while retaining the loose filtering agent in the tubular member.

7. A low pressure cartridge for liquid filtration, comprising:

a tubular member having a first open end;

a first cap member comprising a cylindrical side wall configured to fit telescopically with said first open end of said tubular member, and an end wall contiguous with and generally transverse to said cylindrical side wall for covering said first open end of said tubular member, said tubular member and said cylindrical side wall of said end cap member together having at least two circumferential raised rings and at least two circumferential grooves formed therein, wherein said grooves are sized and spaced axially from one another to simultaneously receive all of said rings so that said end cap member is securable to said tubular member by pressing said end cap member onto said first open end of said tubular member, thereby seating said circumferential rings in said grooves, whereby the interference between said circumferential grooves and said raised rings seated therein comprises the only means of attachment between said first end cap member and said tubular member.

8. A filter cartridge as set forth in claim 7, wherein there are at least three of said raised rings and at least three of said circumferential grooves for said first end cap member and said first open end of said tubular member, wherein the axial spacing between the first and second mating pairs of said rings and grooves is different from the axial spacing between the second and third mating paris of said rings and grooves.

9. A filter cartridge as set forth in claim 8, wherein all of said raised rings are located on either said first end cap member or said tubular member.

10. A filter cartridge as set forth in claim 9, wherein all of said raised rings are located on an inner circumferential surface of said cylindrical side wall of said first end cap member.

11. A filer cartridge as set forth in claim 10, wherein each of said circumferential grooves and said raised rings is generally triangular in radial cross-section with a pair of generally planar, bevelled walls, and wherein said generally planar, bevelled walls of each of said circumferential grooves and said raised rings form a lesser included angle of about 70° or less with respect to a radial axis of the filter cartridge.

12. A filter cartridge as set forth in claim 11, further comprising O-rings compressed between said cylindrical side wall of said first end cap member and said tubular member to prevent liquid leakage therebetween, wherein said O-ring, and said circumferential grooves and said raised rings seated therein, constitute the only means of coupling said first end cap member and said tubular member together.

13. A low pressure cartridge for liquid filtration as set forth in claim 7, further comprising sealing means disposed between said cylindrical side wall of said first end cap member and said tubular member.

14. A filter cartridge as set forth in claim 13, wherein said sealing means comprise an O-ring, and said O-ring provides additional interference to secure said end cap member to said tubular member.

15. A filter cartridge as set forth in claim 7, wherein each of said circumferential grooves and said raised rings has a generally triangular cross-sectional configuration, with a pair of bevelled walls.

16. A filter cartridge as set forth in claim 15, wherein each of said bevelled walls of each of said circumferential grooves and raised rings is generally planar and forms a lesser included angle of about 70° or less with a radial axis of the filter cartridge.

17. A filter cartridge as set forth in claim 7, further comprising:

orifice means disposed through said first end cap member for passing liquid through the filter cartridge;

a loose filtering agent disposed in said tubular member; and first porous retaining means at least partially held between said first end cap member and said tubular member at said first open end of said tubular member for passing a liquid between said orifice means and said loose filtering agent while retaining said loose filtering agent within said tubular member.

18. A filter cartridge as set forth in claim 17, wherein said first porous retaining means comprises:

a generally annular first retainer; and a porous, flexible membrane clamped between said first retainer and one of said first end cap member and said tubular member.

19. A low pressure cartridge for liquid filtration as set forth in claim 7, further comprising:

a second open end on said tubular member, longitudinally opposed from said first open end; and a second end cap member having a cylindrical side wall sized to fit telescopically with said second open end of said tubular member, said second end cap member including an end wall contiguous with and generally transverse to said cylindrical side wall for covering said second open end of said tubular member, said cylindrical side wall of said second end cap member and said second end portion of said tubular member together having at least two circumferential raised rings and at least two circumferential grooves formed therein, wherein said grooves are sized and spaced axially from one another to simultaneously receive all of said raised rings to that said second end cap member is securable to said tubular member by pressing said second end cap member onto said second open end of said tubular member, thereby eating said circumferential rings in said grooves, whereby the interference between said grooves and said raised rings comprises the only means of attachment between said second end cap member and said tubular member.

20. A filter cartridge as set forth in claim 19, further comprising sealing means disposed between said cylindrical side wall of said second end cap member and said second open end of said tubular member.

21. A filter cartridge as set forth in claim 19, further comprising:

first orifice means through said first end cap member for introducing liquid into the filter cartridge;

second orifice means through said second end cap member for passing liquid out of said filter cartridge;

first porous retaining means at least partially held between said first end cap member and said tubular member at said first open end;

second porous retaining means at least partially held between said second end cap member and said tubular member at said second open end; and a loose filtering agent disposed within said tubular member, retained by and between said first and second porous retaining means.

* * * * *

UNITED STATES PATENT AND TRADEMARK OFFICE
CERTIFICATE OF CORRECTION

PATENT NO. : 5,108,599
DATED : April 28, 1992
INVENTOR(S) : Richard K. Lowery

It is certified that error appears in the above-indentified patent and that said Letters Patent is hereby corrected as shown below:

TITLE PAGE

In the Attorney, Agent, or Firm:
Please correct the name "Bearmen" to read --Bearman--.

Col. 2, line 54, please change the word "closed" to read -- closes--.

Col. 4, line 43, please change the "5" to read --50--.

Col. 6, line 43, please change the "81 and 02" to read --θ1 and θ2--.

Col. 6, line 46, please change the "01" to read --θ1--.

Col. 6, line 50, please change the "01 and 02" to read --θ1 and θ2--.

Col. 6, line 55, please change the "81 and 82" to read --θ1 and θ2--.

Signed and Sealed this

Fifteenth Day of February, 1994

Attest:

BRUCE LEHMAN

Attesting Officer

Commissioner of Patents and Trademarks